United States Patent
Wood et al.

(10) Patent No.: US 9,574,134 B2
(45) Date of Patent: Feb. 21, 2017

(54) LIGHT EMITTING DEVICE INCLUDING SEMICONDUCTOR NANOCRYSTALS

(75) Inventors: Vanessa Wood, Cambridge, MA (US); Matthew J. Panzer, Cambridge, MA (US); Jonathan E. Halpert, McClean, VA (US); Moungi G. Bawendi, Cambridge, MA (US); Vladimir Bulovic, Lexington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1323 days.

(21) Appl. No.: 12/776,126

(22) Filed: May 7, 2010

(65) Prior Publication Data

US 2011/0025224 A1   Feb. 3, 2011

Related U.S. Application Data

(60) Provisional application No. 61/176,344, filed on May 7, 2009.

(51) Int. Cl.
| | |
|---|---|
| *H01L 31/12* | (2006.01) |
| *C09K 11/56* | (2006.01) |
| *H05B 33/14* | (2006.01) |
| *H05B 33/22* | (2006.01) |

(52) U.S. Cl.
CPC .............. *C09K 11/565* (2013.01); *H05B 33/14* (2013.01); *H05B 33/22* (2013.01)

(58) Field of Classification Search
CPC .............. H05B 33/20; H05B 3/14; H05B 3/20; H05B 3/22; C09K 11/565
See application file for complete search history.

(56) References Cited

U.S. PATENT DOCUMENTS

| | | | | |
|---|---|---|---|---|
| 5,512,131 | A * | 4/1996 | Kumar et al. | ................ 438/738 |
| 6,180,239 | B1 | 1/2001 | Whitesides et al. | |
| 6,251,303 | B1 * | 6/2001 | Bawendi et al. | ...... 252/301.4 R |

(Continued)

FOREIGN PATENT DOCUMENTS

| | | |
|---|---|---|
| JP | A-2003-217861 | 7/2003 |
| JP | A-2004-296950 | 10/2004 |

(Continued)

OTHER PUBLICATIONS

Toyama, T et al: 'Novel green thin-film electroluminescent devices utilizing ZnS nanocrystals doped with Tb compounds', Applied Surface Science, Elsevier, Amsterdam, NL, LNKD-D01;10.1016, pp. 524-527, May 15, 2005.*

(Continued)

*Primary Examiner* — Jason M Crawford
(74) *Attorney, Agent, or Firm* — Steptoe & Johnson LLP (57) ABSTRACT

A voltage driven light emitting device includes an electroluminescent material and semiconductor nanocrystals, luminescent organic small molecules, mixtures of emissive species molecules, or conductive polymers. The semiconductor nanocrystals, luminescent organic small molecules, mixtures of emissive species molecules, or conductive polymers emit light. The semiconductor nanocrystals, luminescent organic small molecules, mixtures of emissive species molecules, or conductive polymers can be doped to provide desired emission characteristics. Devices that share a substrate and emit more than one color may be conveniently made.

16 Claims, 6 Drawing Sheets

(56) References Cited

U.S. PATENT DOCUMENTS

| | | | |
|---|---|---|---|
| 6,322,901 | B1 | 11/2001 | Bawendi et al. |
| 6,518,168 | B1* | 2/2003 | Clem et al. .................. 438/623 |
| 6,576,291 | B2 | 6/2003 | Bawendi et al. |
| 6,797,412 | B1* | 9/2004 | Jain ........................ B82Y 20/00 257/103 |
| 7,253,452 | B2 | 8/2007 | Steckel et al. |
| 7,332,211 | B1* | 2/2008 | Bulovic et al. ............... 428/206 |
| 2004/0245647 | A1* | 12/2004 | Perlo .................... H05B 33/145 257/762 |
| 2006/0157720 | A1* | 7/2006 | Bawendi et al. ............... 257/98 |
| 2006/0196375 | A1* | 9/2006 | Coe-Sullivan et al. ...... 101/327 |
| 2008/0001167 | A1* | 1/2008 | Coe-Sullivan et al. ...... 257/146 |
| 2008/0074050 | A1* | 3/2008 | Chen .................... C09K 11/565 313/509 |
| 2008/0084050 | A1* | 4/2008 | Volkmann et al. ........ 280/728.2 |
| 2010/0208507 | A1* | 8/2010 | Park ....................... B82Y 20/00 365/111 |

FOREIGN PATENT DOCUMENTS

| | | |
|---|---|---|
| JP | A-2004-303592 | 10/2004 |
| JP | A-2005-38634 | 2/2005 |
| WO | WO 03/021694 | 3/2003 |
| WO | WO2007/073600 | 7/2007 |

OTHER PUBLICATIONS

Adachi, D et al. 'Excitation Mechanism of Luminescence Centers in Nanostructured ZnS:Tb, F Thin-Film Electroluminescent Devices', Japanese Journal of Applied Physics, vol. 47, No. 1, 2008.*

Adachi, D et al. 'Blue emitting thin-film electroluminescent devices utilizing Tm-doped ZnS nanocrystals' Journal of Non-crystaline Solids, North-Holland Physics Publishing. Amsterdam, NL, pp. 1628-1631, Jun. 15, 2006.*

Xu, X et al 'Direct interband trainsitions in tris-(8-hydroxyquinoline) aluminum thin films' Journal of Applied Physics, American Institute of Physics. New Your, US, pp. 1082-1086, Jan. 15, 2001.*

Taylor et al Redlight emission from hybrid organic/inorganic quantum dot AC light emitting displays, Displays Devices, DEMPA Publications, Tokyo, JP, pp. 92-96, Apr. 1, 2007.*

Masi J V Ed—Institute of Electrical and Electronics Engineers 'Polymers: conductors, insulators, and active devices' Proceedings of the Electrical Insulation Conference and Electrical Manufacturing and Coil Winding Ocnference, Indianapolis IN, pp. 199-206, Sep. 23-25, 2003.*

Kim, Jae-Yoo et al. Poly[2-N-carbazoly1)-5-(2-ethylhexyloxy)-1,4-phenylenevinylene]/tris (8-hydroxyquinoline) aluminum heterojunction electroluminescent devices produced by cluster beam deposition methods, Journal of Applied Physics, vol. 91, No. 4, Feb. 15, 2002.*

Xu, et al. 'Direct interband transistions in tris-(8-hydroxyquinoline) aluminum thin films' (Journal of Applied Physics, American Institute of Physics, New York, US, pp. 1082-1086, Jan. 15, 2001.*

Toyama, et al: 'Novel green thin-film electroluminescent devices utilizing ZnS nanocrystals doped with Tb compounds', Osaka University, Applied Surface Science 244 (2005) 527-527.*

R.M Taylor et al. "Red light emission from hybrid organic/inorganic quanton dot AC light emitting displays" ScienceDirect : Displays 28 (2007) 92-96.*

Adachi et al., Appl. Phys. Lett. 78, 1622 (2001).
Alivisatos A. P. Science 1996, 271, 933.
Bulovic et al., Semiconductors and Semimetals 64, 255 (2000).
Bulovic, V. et al., Nature 1996, 380, 29.
D'Andrade et al., MRS Fall Meeting, BB6.2 (2001).
Dabbousi et al., J. Phys. Chem. 101, 9463 (1997).
Din et al., Jpn. J. Appl. Phys. 37, 1457 (1998).
Dur M., et al.; J. Appl. Phys. 1998, 83, 3176.
G. Yu et al. Applied Physics Letters 73:111-113 (1998).
Gu, G. et al., Appl. Phys. Lett. 1996, 68, 2606-2608.
Hanif K. M., et al.; J. Am. Chem. Soc. 2002, 122, 2532.
Keir J. P.; Wager J. F. Annu. Rev. Mat. Sci. 1997, 27, 223.
Levy L., et al.; J. Phys. Chem. 1996, 100, 18322.
Norris D. J., et al.; Nano Lett. 2007, 1, 3.
Pradhan N., et al.; J. Amer. Chem. Soc. 2005, 127, 17528.
Pradhan N.; Peng X. J. Amer. Chem. Soc. 2006, 129, 3339.
Shim M.; Guyot-Sionnest P. Nature 2000, 407, 981.
Thakar et al.; Nano Lett. 2007, 7, 3429.
Wang Y., et al.; Solid State Comm. 1991, 77, 33.
Yamasaki et al., Appl. Phys. Lett. 76, 1243 (2000).
Yang H., et al.; J. Nanoscience and Nanotechnology 2005, 5, 1364.
Toyama, T. et al., Applied Surface Science, 2005, 244(1-4): 524-527.
Adachi, D. et al., J. Non-crystalline Solids, 2006, 352(9-20): 1628-1631.
Adachi, D. et al. Japanese J. Appl. Phys., 2008, 41(1): 83-86.
Taylor et al., Displays Devices, 2007, 28(2): 92-96.
Xu, et al., J. Appl. Phys, 2001, 89(2): 1082-1086.
Masi, J., et al., Proc. Elec. Insulation Conf., 2003, 23: 199-206.
Liu et al., Thin Solid Films, 2005, 489(1-2): 296-302.
SPIE, PO Box 10 Bellingham, WA 98227-0010; XP040190218.
Kim, J., et al., J. Appl. Phys., 2002, 91(4): 1944-1951.

* cited by examiner

LIGHT EMITTING DEVICE INCLUDING SEMICONDUCTOR NANOCRYSTALS

CLAIM OF PRIORITY

This application claims priority to provisional U.S. Patent Application No. 61/176,344 filed on May 7, 2009, which is incorporated by reference in its entirety.

FEDERALLY SPONSORED RESEARCH OR DEVELOPMENT

This invention was made with Government Support under Grant No. DMR0213282, awarded by the National Science Foundation, Grant No. FA9550-04-1-0462, awarded by the Air Force Office of Scientific Research, and Grant No. W911NF-07-D-0004, awarded by the Army Research Office. The Government has certain rights in this invention.

TECHNICAL FIELD

The present invention relates to light emitting devices including semiconductor nanocrystals.

BACKGROUND

Light-emitting devices can be used, for example, in displays (e.g., flat-panel displays), screens (e.g., computer screens), and other items that require illumination. Accordingly, the brightness of the light-emitting device is an important feature of the device. Also, low operating voltages and high efficiencies can improve the viability of producing emissive devices. In many applications, long device lifetime is desirable.

Light-emitting devices can release photons in response to excitation of an active component of the device. Emission can be stimulated by applying a voltage across the active component (e.g., an electroluminescent component) of the device. Some devices can be operated with a time-varying voltage, i.e., an alternating current; such devices can be referred to as alternating current thin-film electroluminescent (AC-TFEL) devices. The electroluminescent component can be a polymer, such as a conjugated organic polymer or a polymer containing electroluminescent moieties or layers of organic molecules. Typically, the emission can occur by radiative recombination of an excited charge between layers of a device. The emitted light has an emission profile that includes a maximum emission wavelength, and an emission intensity, measured in luminance (candelas/square meter ($cd/m^2$) or power flux ($W/m^2$)). The emission profile, and other physical characteristics of the device, can be altered by the electronic structure (e.g., energy gaps) of the material. For example, the brightness, range of color, efficiency, operating voltage, and operating half-lives of light-emitting devices can vary based on the structure of the device.

SUMMARY

In general, a light emitting device can include a plurality of semiconductor nanocrystals. Semiconductor nanocrystals can be inorganic semiconductor particles, for example, 1-15 nm in diameter, optionally decorated with organic ligands. Nanocrystals can show strong quantum confinement effects that can be harnessed in designing bottom-up chemical approaches to create complex heterostructures with electronic and optical properties that are tunable with the size and composition of the nanocrystals. The nanocrystals can be doped, e.g., with a transition metal such as Fe, Ni, Mn, and Cu, or with a lanthanide, such as Eu, Er, Tm, or Tb.

Semiconductor nanocrystals can be used as an emissive material in a light emitting device. Because semiconductor nanocrystals can have narrow emission linewidths, can be photoluminescent efficient, and emission wavelength tunable, they can be a desirable emissive material. These optical properties of the nanocrystals themselves can be influenced by selection of nanocrystals having appropriate composition, size, and configuration. Semiconductor nanocrystals, luminescent organic small molecules, mixtures of emissive species molecules, or conductive polymers can be dispersed in a liquid and are therefore compatible with thin-film deposition techniques such as spin-casting, drop-casting, thermally evaporated, or dip coating.

Semiconductor nanocrystals, luminescent organic small molecules, mixtures of emissive species molecules, or conductive polymers can be deposited on a substrate using microcontact printing. Advantageously, microcontact printing allows micron-scale or nano-scale (e.g., less than 1 mm, less than 500 µm, less than 200 µm, less than 100 µm, less than 25 µm, or less than 1 µm) patterning of features on a surface. In particular, a monolayer of semiconductor nanocrystals can be deposited by microcontact printing. In other examples, a multilayer of semiconductor nanocrystals can be deposited on a surface by ink jet printing, spin coating, dip coating, microcontact printing or other methods. The multilayer can be less than 3 microns thick, less than 2 microns thick, or less than 1 micron thick. This approach can allow a substantially dry (i.e., substantially solvent-free) application of a patterned semiconductor nanocrystal film on a substrate. A wider variety of substrates can thus be used, because the choice of substrate can be freed from constraints imposed by solubility and surface chemistry requirements.

A voltage driven electroluminescence device can have a sandwich structure in which a first electrode, a first insulator layer, a wide band-gap material (which acts as the electroluminescence light emitting layer), a second insulator layer, and a second electrode layer are stacked on an insulating substrate. To emit light of different colors, the wide band-gap material must be modified to form active color centers. One disadvantage associated with this structure is the difficulty of engineering layer composition to emit red, green and blue light side by side. A DC bias, or constant voltage (e.g. positive or negative) can be applied to across the device to change the emissive color of the pixel.

When semiconductor nanocrystals are included in a voltage driven light emitting device, the device can produce light of a desired color or colors. Multiple devices that emit different colors of light can be easily produced side by side with little or no change to material processing conditions used in device fabrication.

Colloidally-synthesized nanocrystals can be used as an emissive material in electroluminescent devices, such as AC-TFEL devices. The device can fabricated at room temperature, using a solution-deposited active layer. Wide band gap host nanocrystals and wide band gap metal oxides allow transparent devices.

In one aspect, a light emitting device includes a first electrode; a first dielectric material adjacent to the first electrode; a second electrode; a second dielectric material adjacent to the second electrode; and an emissive layer between the first dielectric material and second dielectric material, where the emissive layer includes a wide band gap semiconductor material, an insulating material, or a combination thereof, and a plurality of semiconductor nanocrystals.

The emissive layer can include a first nanocrystal layer having a top face and a bottom face. At least one of the top face and the bottom face can be adjacent to the wide band gap semiconductor material, or the insulating material. The top face can be adjacent to a first layer of the wide band gap semiconductor material or the insulating material, and the bottom face can be adjacent to a second layer of the wide band gap semiconductor material or the insulating material.

The emissive layer can include a polymer matrix, where at least a portion of the plurality of semiconductor nanocrystals are dispersed in the polymer matrix. The emissive layer can include more than one nanocrystal layer alternating with layers of the wide band gap semiconductor material or the insulating material. The device can be substantially transparent to at least a portion of visible wavelengths of light. The plurality of semiconductor nanocrystals can include a doped semiconductor nanocrystal.

The plurality of semiconductor nanocrystals can include a first population of semiconductor nanocrystals selected to emit a single color of light; or can include more than one distinct populations of nanocrystals selected to emit more than one different color of light. The plurality of semiconductor nanocrystals can be selected to produce a white light emission from the device. The first population of semiconductor nanocrystals can be selected to emit visible light, or can be selected to emit infrared light.

In another embodiment, luminescent organic small molecules can be used as an emissive material in a light emitting device. The luminescent small molecules can include tris(8-hydroxyquinolino)aluminum, rubrene, or tris(2-phenylpyridine)iridium. The emissive layer can include a mixture of emissive species molecules or a doped material. The mixture of emissive species molecules can include p-bis(triphenylsilyl)benzene doped with tris(2-phenylpyridine)iridium or tris(8-hydroxyquinolino)aluminum doped with dichloromethane. The emissive layer can include a conductive polymer. The conductive polymer can include poly[2-methoxy-5-(2'-ethyl-hexyloxy)-1,4-phenylene vinylene. The emissive layer can include a mixture of luminescent organic small molecules and semiconductor nanocrystals or a mixture of conductive polymers and semiconductor nanocrystals. The emissive layers can form a multilayer structure including emissive layers of luminescent organic small molecules and emissive layers of semiconductor nanocrystals or a multilayer structure including emissive layers of luminescent organic small molecules or emissive layers of semiconductor nanocrystals.

In another aspect, a method of forming a device includes depositing a first dielectric material adjacent to a first electrode; depositing over the first dielectric material an emissive layer including a wide band gap semiconductor material, an insulating material, or a combination thereof, and a plurality of semiconductor nanocrystals; depositing over the emissive layer a second dielectric material; and assembling a second electrode adjacent to the second dielectric material.

The emissive layer can include a first nanocrystal layer having a top face and a bottom face. At least one of the top face and the bottom face can be adjacent to the wide band gap semiconductor material or the insulating material. The top face can be adjacent to a first layer of the wide band gap semiconductor material or the insulating material, and the bottom face can be adjacent to a second layer of the wide band gap semiconductor material or the insulating material.

In another embodiment, the emissive layer can further include a luminescent small organic molecule layer. In another embodiment, the emissive layer can further include a mixture of emissive species molecules or a doped material. The emissive layer can further includes a conductive polymer. In another embodiment, the emissive layer can further include a mixture of luminescent organic small molecules and semiconductor nanocrystals or a mixture of conductive polymers and semiconductor nanocrystals. In another embodiment, the emissive layer can further include emissive layers forming a multilayer structure including emissive layers of luminescent organic small molecules and emissive layers of semiconductor nanocrystals or a multilayer structure including emissive layers of luminescent organic small molecules or emissive layers of semiconductor nanocrystals.

Depositing the emissive layer can include depositing a polymer matrix, where at least a portion of the plurality of semiconductor nanocrystals are dispersed in the polymer matrix. Depositing the emissive layer can include alternately depositing layers of the wide band gap semiconductor material or the insulating material with one or more nanocrystal layers. Depositing the emissive layer can include selecting a first population of semiconductor nanocrystals to emit a single color of light, or can include selecting more than one distinct populations of semiconductor nanocrystals to emit more than one different colors of light. Depositing the emissive layer can include selecting semiconductor nanocrystals to produce a white light emission from the device.

Depositing the emissive layer can include depositing a luminescent small organic molecule layer. Depositing the emissive layer can include alternately a mixture of emissive species molecules or a doped material. Depositing the emissive layer can include a conductive polymer. In another embodiment, depositing the emissive layer can include a mixture of luminescent organic small molecules and semiconductor nanocrystals or a mixture of conductive polymers and semiconductor nanocrystals. Depositing the emissive layer can include emissive layers forming a multilayer structure including emissive layers of luminescent organic small molecules and emissive layers of semiconductor nanocrystals or a multilayer structure including emissive layers of luminescent organic small molecules or emissive layers of semiconductor nanocrystals.

Depositing the first dielectric material can include sputtering the first dielectric material, thereby forming a layer of the first dielectric material. Depositing the emissive layer can include sputtering the wide band gap semiconductor material or the insulating material, thereby forming a layer of the wide band gap semiconductor material or the insulating material. Depositing the emissive layer can include contacting a dispersion including semiconductor nanocrystals with the layer of the wide band gap semiconductor material or the insulating material.

Depositing the emissive layer can include contacting a dispersion of a luminescent small organic molecule with the layer of the wide band gap semiconductor material or the insulating material. Depositing the emissive layer can include contacting a dispersion of a mixture of emissive species molecules or a doped material with the layer of the wide band gap semiconductor material or the insulating material. Depositing the emissive layer can include contacting a dispersion of a conductive polymer with the layer of the wide band gap semiconductor material or the insulating material. In another embodiment, depositing the emissive layer can include contacting a dispersion of a mixture of luminescent organic small molecules and semiconductor nanocrystals or a mixture of conductive polymers and semiconductor nanocrystals with the layer of the wide band gap semiconductor material or the insulating material. Depositing the emissive layer can include emissive layers forming a multilayer structure including emissive layers of luminescent organic small molecules and emissive layers of semiconductor nanocrystals or a multilayer structure including emissive layers of luminescent organic small molecules or emissive layers of semiconductor nanocrystals.

Contacting a dispersion including semiconductor nanocrystals with the layer of the wide band gap semiconductor material or the insulating material can include spin casting, ink jet printing, microcontact printing, electrospray, or a combination thereof.

Depositing the emissive layer can optionally include alternately repeating a predetermined number of times the steps of sputtering the wide band gap semiconductor material or the insulating material, thereby forming a layer of the wide band gap semiconductor material or the insulating material, and contacting a dispersion including semiconductor nanocrystals with the layer of the wide band gap semiconductor material or the insulating material. Depositing the second dielectric material can include sputtering the second dielectric material, thereby forming a layer of the second dielectric material. Assembling a second electrode adjacent to the second dielectric material can include sputtering to deposit the second electrode.

In another aspect, a method of generating light includes: providing a device including a first electrode; a first dielectric material adjacent to the first electrode; a second electrode; a second dielectric material adjacent to the second electrode; and an emissive layer between the first dielectric material and second dielectric material, wherein the emissive layer includes a wide band gap semiconductor material, an insulating material, or a combination thereof, and a plurality of semiconductor nanocrystals; and applying a light-generating potential across the first electrode and the second electrode.

The emissive layer can include a first nanocrystal layer having a top face and a bottom face. At least one of the top face and the bottom face can be adjacent to the wide band gap semiconductor material or the insulating material. The top face can be adjacent to a first layer of the wide band gap semiconductor material or the insulating material, and the bottom face can be adjacent to a second layer of the wide band gap semiconductor material or the insulating material. The emissive layer can include more than one nanocrystal layer alternating with layers of the wide band gap semiconductor material or the insulating material.

The emissive layer can include a polymer matrix, wherein at least a portion of the plurality of semiconductor nanocrystals are dispersed in the polymer matrix. The device can be substantially transparent to at least a portion of visible wavelengths of light. The plurality of semiconductor nanocrystals can include a doped semiconductor nanocrystal. The plurality of semiconductor nanocrystals can include a first population of semiconductor nanocrystals selected to emit a single color of light, or selected to emit more than one different color of light. The plurality of semiconductor nanocrystals can be selected to produce a white light emission from the device. The first population of semiconductor nanocrystals can selected to emit visible light, or can be selected to emit infrared light.

In another embodiment, luminescent organic small molecules can be used as an emissive material in a light emitting device. The luminescent small molecules can include tris(8-hydroxyquinolino)aluminum, rubrene, or tris(2-phenylpyridine)iridium. The emissive layer can include a mixture of emissive species molecules or a doped material. The mixture of emissive species molecules can include p-bis(triphenylsilyl)benzene doped with tris(2-phenylpyridine)iridium or tris(8-hydroxyquinolino)aluminum doped with dichloromethane. The emissive layer can include a conductive polymer. The conductive polymer can include poly[2-methoxy-5-(2'-ethyl-hexyloxy)-1,4-phenylene vinylene. The emissive layer can include a mixture of luminescent organic small molecules and semiconductor nanocrystals or a mixture of conductive polymers and semiconductor nanocrystals. The emissive layers can form a multilayer structure including emissive layers of luminescent organic small molecules and emissive layers of semiconductor nanocrystals or a multilayer structure including emissive layers of luminescent organic small molecules or emissive layers of semiconductor nanocrystals.

A light-generating potential can be applied across the first electrode and the second electrode. A light-generating potential across the first electrode and the second electrode can include applying DC bias. The bias can be constant or can be varied at a random, constant or periodic rate.

In another aspect, a light emitting device includes a first electrode; a first dielectric material including a metal oxide adjacent to the first electrode; a second electrode; a second dielectric material including a metal oxide adjacent to the second electrode; and an emissive layer between the first dielectric material and second dielectric material, wherein the emissive layer includes a semiconductor nanocrystal layer having a top face adjacent to a layer including a wide band gap semiconductor material, an insulating material, or a combination thereof, and a bottom face adjacent to a layer including a wide band gap semiconductor material, an insulating material, or a combination thereof.

The emissive layer can include more than one nanocrystal layer alternating with layers of the wide band gap semiconductor material or the insulating material. The wide band gap semiconductor material can be ZnS. The plurality of semiconductor nanocrystals can include a doped semiconductor nanocrystal. The plurality of semiconductor nanocrystals can include a first population of semiconductor nanocrystals selected to emit a single color of light, or can include more than one distinct populations of nanocrystals selected to emit more than one different color of light.

In another embodiment, luminescent organic small molecules can be used as an emissive material in a light emitting device. The luminescent small molecules can include tris(8-hydroxyquinolino)aluminum, rubrene, or tris(2-phenylpyridine)iridium. The emissive layer can include a mixture of emissive species molecules or a doped material. The mixture of emissive species molecules can include p-bis(triphenylsilyl)benzene doped with tris(2-phenylpyridine)iridium or tris(8-hydroxyquinolino)aluminum doped with dichloromethane. The emissive layer can include a conductive polymer. The conductive polymer can include poly[2-methoxy-5-(2'-ethyl-hexyloxy)-1,4-phenylene vinylene. The emissive layer can include a mixture of luminescent organic small molecules and semiconductor nanocrystals or a mixture of conductive polymers and semiconductor nanocrystals. The emissive layers can form a multilayer structure including emissive layers of luminescent organic small molecules and emissive layers of semiconductor nanocrystals or a multilayer structure including emissive layers of luminescent organic small molecules or emissive layers of semiconductor nanocrystals.

Other features, objects, and advantages of the invention will be apparent from the description and drawings, and from the claims.

DETAILED DESCRIPTION

A light emitting device can include two or more layers separating two electrodes of the device. The layers can include a dielectric layer interposed between the electrodes and an emissive layer. When a voltage is applied across the electrodes, excitons can be formed on an electroluminescent material. The excitons can then recombine to emit light. The electroluminescent material can be selected for its emissive properties, such as emission wavelength or linewidth. The electroluminescent material can be a wide band gap material.

Figure 1:
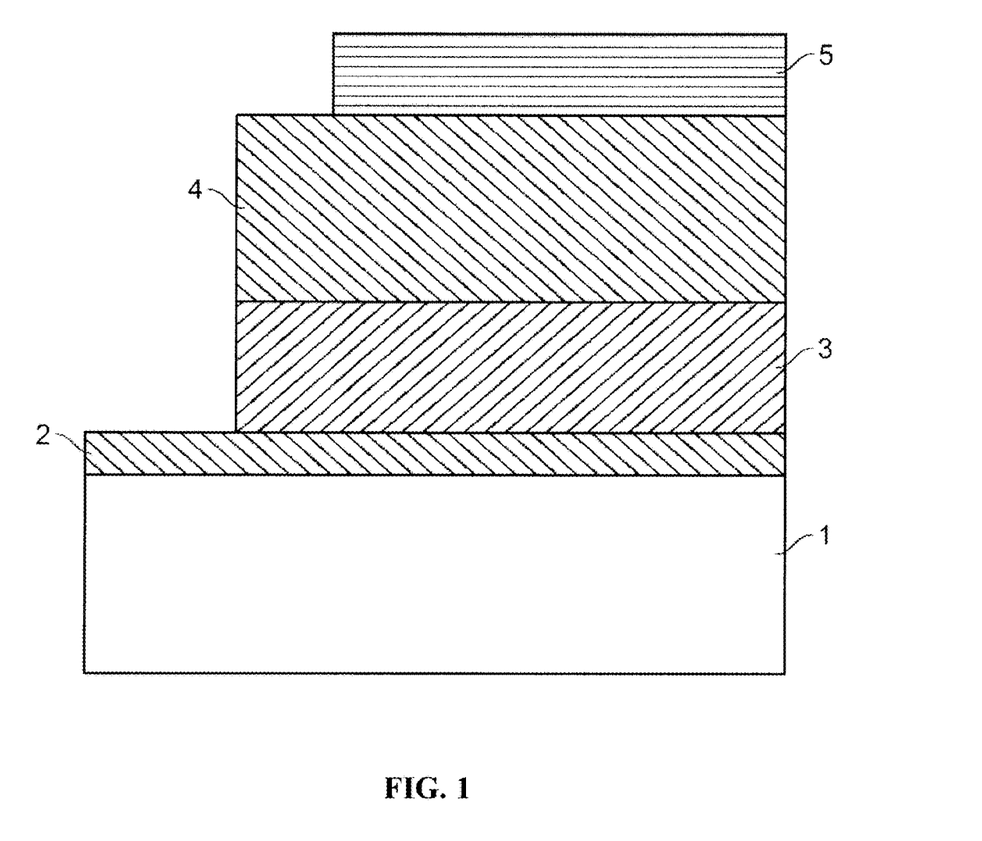
FIG. 1 is a schematic drawing depicting a light-emitting device.

A light emitting device can have a structure such as shown in FIG. 1, in which a first electrode 2, a first layer 3 in contact with the electrode 2, a second layer 4 in contact with the layer 3, and a second electrode 5 in contact with the second layer 4. First layer 3 and second layer 4 can each be an insulating dielectric. One of the electrodes of the structure is in contact with a substrate 1. Each electrode can contact a power supply to provide a voltage across the structure. Electroluminescence can be produced by the emissive layer of the heterostructure when a voltage is applied across the heterostructure. A separate emissive layer (not shown in FIG. 1) can be included between the in the device, for example between first layer 3 and second layer 4. The separate emissive layer can include a wide band gap material.

The substrate can be opaque or transparent. A transparent substrate can be used to in the manufacture of a transparent LED. See, for example, Bulovic, V. et al., *Nature* 1996, 380, 29; and Gu, G. et al., *Appl. Phys. Lett.* 1996, 68, 2606-2608, each of which is incorporated by reference in its entirety. Transparent LEDs can be used in applications such as a head-up display, as on a helmet visor or a vehicle windscreen. The substrate can be rigid or flexible. The substrate can be plastic, metal or glass. The first electrode can be, for example, an indium tin oxide (ITO) layer. Other first electrode materials can include gallium indium tin oxide, zinc indium tin oxide, titanium nitride, or polyaniline. The second electrode can be, for example, made of materials such as those described for the first electrode, i.e., ITO, gallium indium tin oxide, zinc indium tin oxide, titanium nitride, and polyaniline. The second electrode, such as Mg:Ag, can be covered with an opaque protective metal layer, for example, a layer of Ag for protecting the cathode layer from atmospheric oxidation; or covered with a relatively thin layer of substantially transparent ITO. The first electrode can have a thickness of about 500 Angstroms to 4000 Angstroms. The first layer can have a thickness of about 50 Angstroms to about 5 micrometers, such as a thickness in the range of 100 Angstroms to 100 nm, 100 nm to 1 micrometer, or 1 micrometer to 5 micrometers. The second layer can have a thickness of about 50 Angstroms to about 5 micrometers, such as a thickness in the range of 100 Angstroms to 100 nm, 100 nm to 1 micrometer, or 1 micrometer to 5 micrometers. The second electrode can have a thickness of about 50 Angstroms to greater than about 1000 Angstroms.

AC-TFEL devices include a phosphor layer, such as manganese doped-zinc sulfide (ZnS:Mn), vertically sandwiched between two insulators that are contacted by electrodes. When a sufficiently high voltage is applied across the electrodes, electrons trapped at interfaces between the layers are injected into the conduction band of the phosphor, where they are accelerated by the field and can excite the luminescent dopant centers in the phosphor layer via impact excitation and ionization mechanisms (see, for example, Keir J. P.; Wager J. F. *Annu. Rev. Mat. Sci.* 1997, 27, 223; and Dur M., et al.; *J. Appl. Phys.* 1998, 83, 3176, which is incorporated by reference in its entirety).

A dielectric layer can include a material selected for its insulating properties and compatibility with device manufacturing procedures. Some exemplary dielectric materials include, without limitation, a metal oxide (e.g., a silicon oxide such as $SiO_2$, an aluminum oxide such as $Al_2O_3$, or a hafnium oxide such as $HfO_2$), and a wide band gap polymer (e.g., polymethylmethacrylate). The emissive layer includes an emissive material. Zinc sulfide, for example, is a suitable material.

In some embodiments, the dielectric material and the emissive material are combined in a single material. For example, crystals of zinc sulfide can be coated or encapsulated in a dielectric material, such as a polymer. These polymer-coated crystals can serve as dielectric and emissive material together in a single material.

The layers can be deposited on a surface of one of the electrodes by spin coating, dip coating, vapor deposition, sputtering, or other thin film deposition methods. The second electrode can be sandwiched, sputtered, or evaporated onto the exposed surface of the solid layer. One or both of the electrodes can be patterned. The electrodes of the device can be connected to a voltage source by electrically conductive pathways. Upon application of the voltage, light is generated from the device.

Advantageously, the inorganic semiconductor can be deposited on a substrate at a low temperature, for example, by sputtering. Sputtering is performed by applying a high voltage across a low-pressure gas (for example, argon) to create a plasma of electrons and gas ions in a high-energy state. Energized plasma ions strike a target of the desired coating material, causing atoms from that target to be ejected with enough energy to travel to, and bond with, the substrate.

Microcontact printing provides a method for applying a material to a predefined region on a substrate. The predefined region is a region on the substrate where the material is selectively applied. The material and substrate can be chosen such that the material remains substantially entirely within the predetermined area. By selecting a predefined region that forms a pattern, material can be applied to the substrate such that the material forms a pattern. The pattern can be a regular pattern (such as an array, or a series of lines), or an irregular pattern. Once a pattern of material is formed on the substrate, the substrate can have a region including the material (the predefined region) and a region substantially free of material. In some circumstances, the material forms a monolayer on the substrate. The predefined region can be a discontinuous region. In other words, when the material is applied to the predefined region of the substrate, locations including the material can be separated by other locations that are substantially free of the material. In other examples, a multilayer of semiconductor nanocrystals can be deposited on a surface by ink jet printing, spin coating, dip coating, microcontact printing or other methods. The multilayer can be less than 3 microns thick, less than 2 microns thick, or less than 1 micron thick. The small molecule organics can be thermally evaporated (co-evaporated in the case of mixtures) or inkjet print deposited. Microcontact printing can also be used to define individual pixels. Conductive polymers can be spin cast or inkjet print deposited.

Microcontact printing and related techniques are described in, for example, U.S. Pat. Nos. 5,512,131; 6,180,239; and 6,518,168, each of which is incorporated by reference in its entirety. In some circumstances, the stamp can be a featureless stamp having a pattern of ink, where the pattern is formed when the ink is applied to the stamp. See U.S. Patent Application Publication No. 2006-0196375, which is incorporated by reference in its entirety.

See, for example, U.S. Patent Application Publication Nos. 2008-0001167, and 2006-0196375, and 2006-0157720, and US-2008-0074050, each of which is incorporated by reference in its entirety.

The electrical properties (such as band gaps and band offsets) of the device materials can be selected in combination with the device structure to produce a device where excitons are formed substantially on the wide band gap emissive material. The emissive material can transfer energy to an emission-altering material before light is emitted from the device. Energy transfer can occur by emission of light from the emissive material and reabsorption by the emission-altering material. Alternatively, the energy transfer can be a transfer of energy with light emission and reabsorption (such as Förster energy transfer). In either case, once the emission-altering material is in an excited state, it can emit light. In some circumstances, emission and reabsorption can be the primary method of energy transfer. When this is so, the emission-altering material need not be adjacent to the emissive material. The efficiency of Förster energy transfer, however, depends on the distance between the energy transfer partners, with smaller distances giving greater efficiency of energy transfer.

Semiconductor nanocrystals can advantageously be used as an emission-altering material. The semiconductor nanocrystals can have a broad absorption band with an intense, narrow band emission. The peak wavelength of emission can be tuned from throughout the visible and infrared regions, depending on the size, shape, composition, and structural configuration of the nanocrystals. The nanocrystals can be prepared with an outer surface having desired chemical characteristics (such as a desired solubility). Light emission by nanocrystals can be stable for long periods of time.

When a nanocrystal achieves an excited state (or in other words, an exciton is located on the nanocrystal), emission can occur at an emission wavelength. The emission has a frequency that corresponds to the band gap of the quantum confined semiconductor material. The band gap is a function of the size of the nanocrystal. Nanocrystals having small diameters can have properties intermediate between molecular and bulk forms of matter. For example, nanocrystals based on semiconductor materials having small diameters can exhibit quantum confinement of both the electron and hole in all three dimensions, which leads to an increase in the effective band gap of the material with decreasing crystallite size. Consequently, both the optical absorption and emission of nanocrystals shift to the blue, or to higher energies, as the size of the crystallites decreases.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region. The narrow size distribution of a population of nanocrystals can result in emission of light in a narrow spectral range. The population can be monodisperse and can exhibit less than a 15% rms deviation in diameter of the nanocrystals, preferably less than 10%, more preferably less than 5%. Spectral emissions in a narrow range of no greater than about 75 nm, preferably 60 nm, more preferably 40 nm, and most preferably 30 nm full width at half max (FWHM) for nanocrystals that emit in the visible can be observed. IR-emitting nanocrystals can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of nanocrystal diameters decreases. Semiconductor nanocrystals can have high emission quantum efficiencies such as greater than 10%, 20%, 30%, 40%, 50%, 60%, 70%, or 80%.

Colloidal nanocrystals can be doped with transition metals (such as Fe, Ni, Mn, Cu) and lanthanides (such as Eu, Er, Tm, Tb) to alter their electronic, optical, and/or magnetic properties. See, for example, Alivisatos A. P. *Science* 1996, 271, 933; Shim M.; Guyot-Sionnest P. *Nature* 2000, 407, 981; Levy L., et al.; *J. Phys. Chem.* 1996, 100, 18322; Hanif K. M., et al.; *J. Am. Chem. Soc.* 2002, 122, 2532; Wang Y., et al.; *Solid State Comm.* 1991, 77, 33; and Norris D. J., et al.; *Nano Lett.* 2007, 1, 3; each of which is incorporated by reference in its entirety. When the excitation energy of the dopant is smaller than the band gap of the host material, the photoluminescence of the doped nanocrystal can be determined by the dopant atoms. In this configuration, the energy of an exciton on the nanocrystal core can be transferred to the dopant. Therefore, light emission from doped nanocrystals can be independent of the band gap of the host material, and largely unaffected by thermal and chemical variations of the surrounding medium (see, e.g., Pradhan N., et al.; *J. Amer. Chem.* Soc. 2005, 127, 17528, which is incorporated by reference in its entirety). For example, by using different dopants or various synthetic procedures, the emission wavelength of doped to ZnSe nanocrystals can be tuned from the blue through the red. See, for example, Yang H., et al.; *J Nanoscience and Nanotechnology* 2005, 5, 1364, which is incorporated by reference in its entirety. When a wide band gap (e.g., a band gap of 3.0 eV or greater) semiconductor such as ZnSe is used for the nanocrystal core, a thin film of nanocrystals does not appreciably absorb visible wavelengths (see FIGS. 4A-4B).

The semiconductor forming the nanocrystals can include a Group II-VI compound, a Group II-V compound, a Group III-VI compound, a Group III-V compound, a Group IV-VI compound, a Group I-III-VI compound, a Group II-IV-VI compound, or a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

Methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals. Preparation and manipulation of nanocrystals are described, for example, in U.S. Pat. Nos. 6,322,901, 6,576,291, and 7,253,452, each of which is incorporated by reference in its entirety. The method of manufacturing a nanocrystal is a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened.

The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl)chalcogenide, dioxygen, an ammonium salt, or a tris(silyl)pnictide. Suitable X donors include dioxygen, bis(trimethylsilyl)selenide ($(TMS)_2Se$), trialkyl phosphine selenides such as (tri-n-octylphosphine)selenide (TOPSe or (tri-n-butylphosphine)selenide (TBPSe), trialkyl phosphine tellurides such as (tri-n-octylphosphine)telluride (TOPTe) or hexapropylphosphorustriamide telluride (HPPTTe), bis(trimethylsilyl)telluride ($(TMS)_2Te$), bis(trimethylsilyl)sulfide ($(TMS)_2S$), a trialkyl phosphine sulfide such as (tri-n-octylphosphine)sulfide (TOPS), an ammonium salt such as an ammonium halide (e.g., $NH_4Cl$), tris(trimethylsilyl)phosphide ($(TMS)_3P$), tris(trimethylsilyl)arsenide ($(TMS)_3As$), or tris(trimethylsilyl)antimonide ($(TMS)_3Sb$). In certain embodiments, the M donor and the X donor can be moieties within the same molecule.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

Doped nanocrystals can be prepared by a method like the one described in Thakar et al.; *Nano Lett.* 2007, 7, 3429, which is incorporated by reference in its entirety. Generally, a nanocrystal of a given size and composed of a particular material can be surface doped, e.g., with a transition metal, and the nanocrystal grown to a larger size by addition of the same material. Alternatively, a nanocrystal of a given size and composed of a particular material can be coated first with a thin coating layer by exposure to coating reagents in the presence of a doping reagent, and then the coating thickness increased by exposure to coating reagents without added doping reagent. See also Alivisatos A. P. *Science* 1996, 271, 933; Shim M.; Guyot-Sionnest P. *Nature* 2000, 407, 981; Levy L., et al.; *J. Phys. Chem.* 1996, 100, 18322; Hanif K. M., et al.; *J. Am. Chem. Soc.* 2002, 122, 2532; Wang Y., et al.; *Solid State Comm.* 1991, 77, 33; Norris D. J., et al.; *Nano Lett.* 2007, 1, 3; Pradhan N., et al.; *J. Amer. Chem. Soc.* 2005, 127, 17528; and Pradhan N.; Peng X. *J. Amer. Chem. Soc.* 2006, 129, 3339, each of which is incorporated by reference in its entirety.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group I-III-VI compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

The outer surface of the nanocrystal can include compounds derived from the coordinating solvent used during the growth process. The surface can be modified by repeated exposure to an excess of a competing coordinating group. For example, a dispersion of the capped nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

More specifically, the coordinating ligand can have the formula:

wherein k is 2, 3 or 5, and n is 1, 2, 3, 4 or 5 such that k–n is not less than zero; X is O, S, S=O, $SO_2$, Se, Se=O, N, N=O, P, P=O, As, or As=O; each of Y and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)—C(O)—N($R^b$)—, —O—C(O)—O—, —P($R^a$)—, or —P(O) ($R^a$)—. Each of $R^a$ and $R^b$, independently, is hydrogen, alkyl, alkenyl, alkynyl, alkoxy, hydroxylalkyl, hydroxyl, or haloalkyl.

An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyiridyl, pyrrolyl, or phenanthryl.

A suitable coordinating ligand can be purchased commercially or prepared by ordinary synthetic organic techniques, for example, as described in J. March, *Advanced Organic Chemistry*, which is incorporated by reference in its entirety.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

Figure 2:
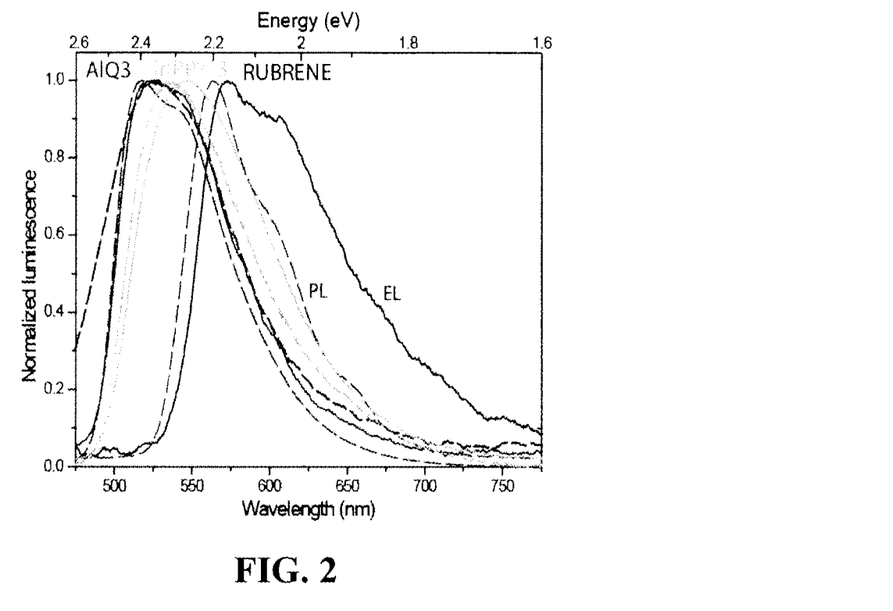
FIG. 2 is a graph depicting photoluminescence (dashed lines) and electroluminescence (solid lines) spectra.
Figure 3:
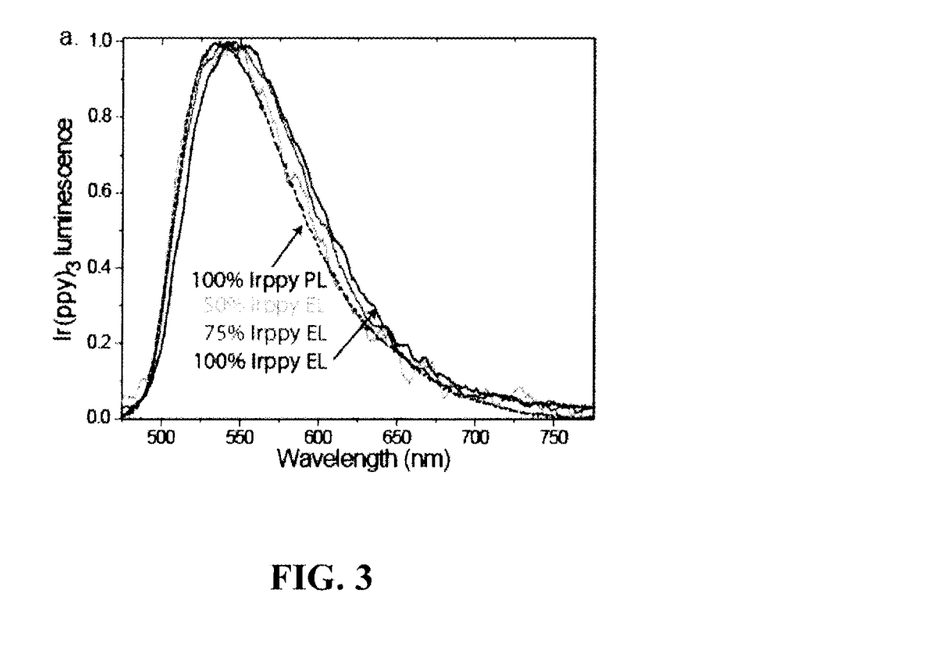
FIG. 3 is an electroluminescent spectrum.

Additional emissive materials can include luminescent organic small molecules, for example, Alq3(tris(8-hydroxyquinolino)aluminum) or rubrene. Phosphorescent organics can also be used as emissive materials, for example, Irppy3 (tris(2-phenylpyridine)iridium, for example, in FIG. 2, photoluminescence (dashed lines) and electroluminescence (solid lines) showing emission from 50 nm thin films of small molecule organics (Alq3, rubrene, and Irppy3). These molecules can be deposited so as to be amorphous or crystalline. In addition, mixtures of organics can be used as the emissive layer, for example, UGH2(p-bis(triphenylsilyl)benzene) doped with Irppy or Alq3 doped with DCM (dichloromethane) (FIG. 3 showing emission from Irppy doped into UGH at different percentages). Clusters of the dopant molecule within the host is required for electroluminescence. The organic layers can be 20 nm to greater than 1 μm in thickness. Additionally, emissive materials may also include conductive polymers, for example, poly[2-methoxy-5-(2'-ethyl-hexyloxy)-1,4-phenylene vinylene (MEH-PPV). The emissive layers can be composed of mixtures of organic molecules, polymers, or semiconductor nanocrystals or multilayer structures of organic molecules and/or semiconductor nanocrystals.

Individual devices can be formed at multiple locations on a single substrate to form a display. The display can include devices that emit at different wavelengths. By patterning the substrate with arrays of different color-emitting materials, a display including pixels of different colors can be formed. In some applications, the substrate can include a backplane. The backplane includes active or passive electronics for controlling or switching power to individual pixels. Include a backplane can be useful for applications such as displays, sensors, or imagers. In particular, the backplane can be configured as an active matrix, passive matrix, fixed format, directly drive, or hybrid. The display can be configured for still images, moving images, or lighting. A lighting display can provide white light, monochrome light, or color-tunable light. See, e.g., U.S. Patent Application Publication No. 2006-0196375, which is incorporated by reference in its entirety.

The device can be made in a controlled (oxygen-free and moisture-free) environment, preventing the quenching of luminescent efficiency during the fabrication process. Other multilayer structures may be used to improve the device performance (see, for example, The performance of light emitting devices can be improved by increasing their efficiency, narrowing or broadening their emission spectra, or polarizing their emission. See, for example, Bulovic et al., Semiconductors and Semimetals 64, 255 (2000), Adachi et al., Appl. Phys. Lett. 78, 1622 (2001), Yamasaki et al., Appl. Phys. Lett. 76, 1243 (2000), Dirr et al., Jpn. J. Appl. Phys. 37, 1457 (1998), and D'Andrade et al., MRS Fall Meeting, BB6.2 (2001), each of which is incorporated herein by reference in its entirety. Nanocrystals can be included in efficient hybrid organic/inorganic light emitting devices.

The narrow FWHM of nanocrystals can result in saturated color emission. This can lead to efficient nanocrystal-light emitting devices even in the red and blue parts of the visible spectrum, since in nanocrystal emitting devices no photons are lost to infrared and UV emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of nanocrystals will emit light spanning a narrow range of wavelengths. A device including more than one size of nanocrystal can emit light in more than one narrow range of wavelengths. The color of emitted light perceived by a viewer can be controlled by selecting appropriate combinations of nanocrystal sizes and materials in the device. The degeneracy of the band edge energy levels of nanocrystals facilitates capture and radiative recombination of all possible excitons, whether generated by direct charge injection, energy transfer, or absorption of light.

Devices can be prepared that emit visible or infrared light. The size and material of a semiconductor nanocrystal can be selected such that the nanocrystal emits visible or infrared light of a selected wavelength. The wavelength can be between 300 and 2,500 nm or greater, for instance between 300 and 400 nm, between 400 and 700 nm, between 700 and 1100 nm, between 1100 and 2500 nm, or greater than 2500 nm.

Individual devices can be formed at multiple locations on a single substrate to form a display. The display can include devices that emit at different wavelengths. By patterning the substrate with arrays of different color-emitting semiconductor nanocrystals, a display including pixels of different colors can be formed.

Figure 4A:
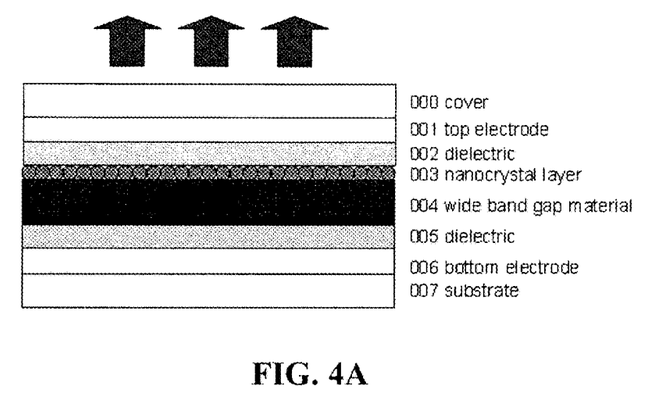
FIGS. 4A-4D are schematic drawings depicting light-emitting devices.

FIG. 4A illustrates a cross-section view of a voltage driven electroluminescent device. In this device, a semiconductor nanocrystal layer 003 (which can be a partial monolayer, monolayer, or multilayer of semiconductor nanocrystals) and a wide band gap material layer 004 are stacked between two insulating layers 002, 005 and two conductive electrodes 001, 006 on a substrate 007. The protection layer 000, conductive layer 001 and insulating layer 002 are transparent to allow light generated in the wide band gap material layer 004 and in the semiconductor nanocrystal layer 003 to exit the device. Alternatively, light can exit the substrate side, provided that the bottom electrode and the substrate are transparent.

According to this construction, the voltage driven nanocrystal electroluminescent device includes a light emission layer including nanocrystals and wide band gap material (such as zinc sulfide) between two insulating layers and conductive electrodes. A voltage is applied across the two conductive electrodes to electrically drive and excite the wide band gap materials; the excitation energy is released either by emitting photons or by transferring energy to the nanocrystal layer. Thus, the nanocrystal layer serves as an energy conversion layer to directly or indirectly convert electrical energy to photon energy. Light associated with nanocrystal's energy structure is emitted as a result of energy conversion within the nanocrystal layer. Consequently, one can engineer the nanocrystal size or composition to achieve light emission of red, green or blue colors, or a combination of colors, and still maintain the chemical composition of the wide band gap material unchanged.

Figure 4B:
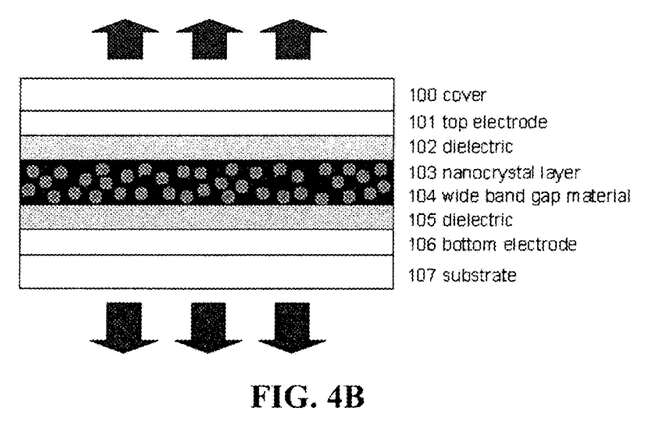

FIG. 4B shows an alternative construction of a voltage driven nanocrystal electroluminescent device. Here, semiconductor nanocrystals 103 are dispersed in a matrix of wide band gap materials 104 between two insulating layers 102, 105 and two conductive electrodes 101, 106 on a substrate 107. Lights from the mixed nanocrystal layer and wide band gap material layer are extracted from the top side and/or bottom side.

Figure 4C:
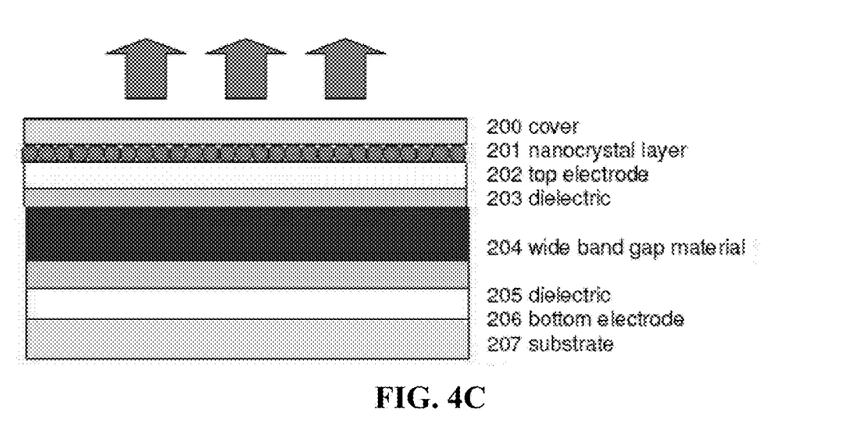

FIG. 4C shows an alternative construction of a voltage driven nanocrystal electroluminescent device. Here, semiconductor nanocrystals 201 are located in a region outside top electrode 202, dielectric 203, wide band gap materials 204, dielectric 205, electrode 206 and substrate 207. Nanocrystals 201 can optionally be protected by a cover 200 (not necessarily present). Light from the wide band gap material layer can excite the nanocrystals by energy transfer or reabsorption.

Figure 4D:
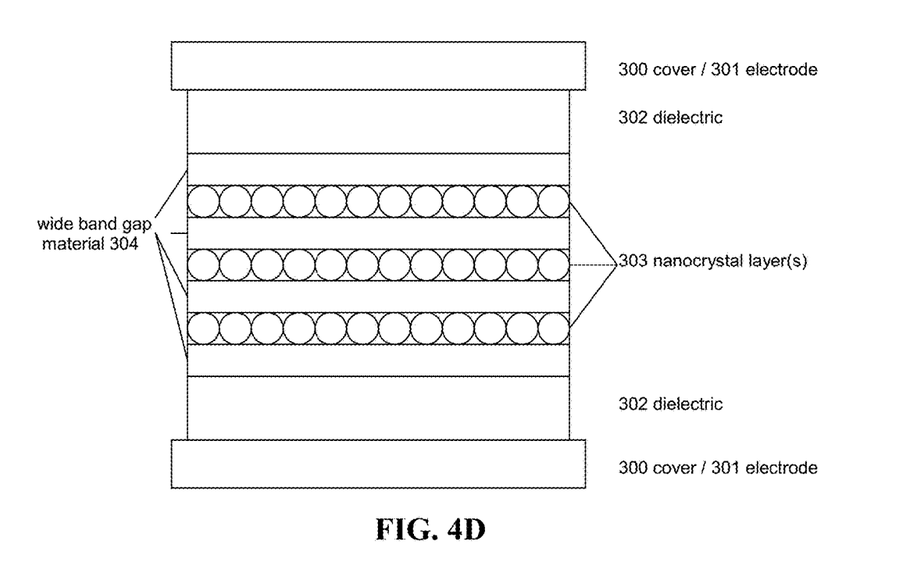

FIG. 4D shows an alternative construction of a voltage driven nanocrystal electroluminescent device. Here, semiconductor nanocrystals 303 are located in a region between dielectric 302. Wide band gap materials 304 separate dielectric 302 from nanocrystals 303. One or more layers of nanocrystals may be present; as illustrated in FIG. 4D, layers of nanocrystals can be separated by a layer of the wide band gap material. Electrodes 301 are arranged to apply a voltage to the device. Covers 300 may be distinct from electrodes 301; in some cases, a single part (e.g., glass coated with ITO) may serve both electrode and cover functions.

In the voltage driven nanocrystal electroluminescent device, an insulating layer such as silicon oxide, aluminum oxide, or hafnium oxide is formed on a substrate. For example, the insulating layer can be deposited by physical or chemical vapor deposition techniques, such as sputtering, CVD, PECVD, or ALD; or by thermally oxidizing a precursor surface (such as thermal oxidation of a silicon substrate to provide a silicon oxide layer). The wide band gap material, for example zinc sulfide, can be cast or sputtered on top of the insulating layer. Then nanocrystal solution can be deposited (e.g., by spin casting, inkjet printing, microcontact printing, or drop casting) on top of the zinc sulfide layer. Alternatively, the wide band gap material (such as a polymer) and the nanocrystals can be dissolved together in a solvent. See, for example, U.S. Pat. No. 7,332,211, which is incorporated by reference in its entirety. Examples of suitable solvents include chloroform and THF. The solution of wide band gap material and nanocrystals can then be deposited. A layer of polymer, for example, polymethylmethacrylate (PMMA) can be used as the second insulating material above the nanocrystal layer. The top electrode and protection layer can be provided by an indium tin oxide (ITO) coated glass slide.

To form a device, a transparent electrode (such as ITO) can be arranged on a transparent substrate. Then, semiconductor nanocrystals are deposited using a large-area compatible, single monolayer deposition technique such as micro-contact printing or a Langmuir-Blodgett (LB) technique. Subsequently, an n-type semiconductor (e.g., ZnO or TiO$_2$) is applied, for example by sputtering, on top of this layer. A metal electrode can be thermally evaporated over this to complete the device. More complicated device structures are also possible. For example, a lightly doped layer can be included proximal to the nanocrystal layer, to minimize non-radiative losses due to exciton quenching by unbound charge carriers in the transport layers. See also, e.g., FIGS. 4A-4D and 5A.

The device can be assembled by separately growing the two transport layers, and physically applying the electrical contacts using an elastomer such as polydimethylsiloxane (PDMS). This avoids the need for direct deposition of material on the nanocrystal layer.

The device can be thermally treated after application of all of the transport layers. The thermal treatment can further enhance injection of charges into the nanocrystals, as well as eliminate the organic capping groups on the nanocrystals. The instability of the capping groups can contribute to device instability.

The applied voltage used for light generation can be an AC voltage or DC voltage. A DC voltage can be supplied by DC voltage generator, including, for example, a battery, a capacitor, or a rectified AC voltage. An AC voltage can be supplied by an AC voltage generator which produces a voltage waveform, such as, for example, a square wave. The waveform can have a frequency of between 10 Hz and 1 MHz, 250 Hz and 100 kHz, or 500 Hz and 10 kHz. The average voltage can be between 2 and 10 volts, or 3 and 8 volts. The percentage of duty cycle used is the calculated as one hundred multiplied by the average voltage divided by the maximum voltage. The percentage of duty cycle is the relative time in an on/off cycle (in %) during which the voltage is on. The frequency, duty cycle, and peak voltage can be adjusted to optimize light output and stability from the device. Some applications of a duty cycle are described, for example, in G. Yu et al. Applied Physics Letters 73:111-113 (1998), incorporated herein by reference in its entirety. For example, the AC voltage waveform can be a 50% duty cycle at 5 V and 1 kHz, which has a maximum voltage of 5 volts, a frequency of 1 kHz, and an average voltage of 2.5 volts. In this way, a low average operating voltage can improve the operating half-lives of the devices.

A display unit can be made using such electroluminescent devices comprising a layer including a nanocrystal layer and wide band gap material between two insulating layers and conductive layers, wherein the light emitting layer generating light of different colors is formed by choosing and patterning nanocrystal layers of desired energy structure and composition. Thus, a multicolor display can be realized.

Figure 6:
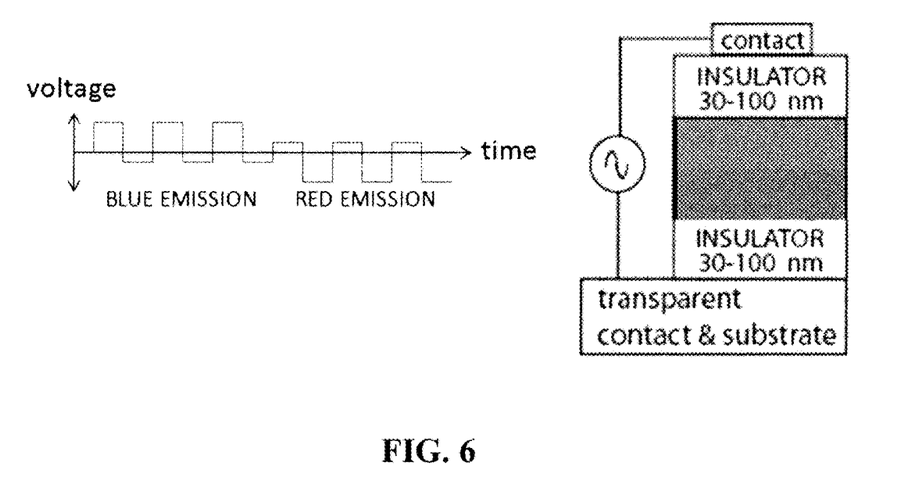
FIG. 6 is a schematic drawing showing possible drive pulse and device construction.

Because these devices can operate via an ionization process of the emissive material, the electroluminescent turn-on voltage of the device can be related to the band gap and confinement of the electroluminescent material. If layers of different materials, or mixtures of different materials, are present within a single emissive layer, the two materials can be excited (made to emit light) at the same time or at different times by simply changing the bias conditions. This can eliminate the need for patterning to achieve multicolor displays. In this case, to achieve multicolor electroluminescence, different DC biases can be introduced to achieve spectrally pure, multicolor electroluminescence from the same pixel (FIG. 6, showing possible drive pulse and device construction to produce blue or red emission from a single pixel containing two luminescent materials, wherein the time scale for switching between blue and red is emission is arbitrarily fast and can be done significantly faster than a video display refresh rate). These devices can be driven by alternating voltage pulses (sine wave, square wave, or any arbitrary waveform is possible). By changing the DC bias added to the alternating voltage pulse so that the voltage exceeds the material electroluminescent turn on at only given times, electroluminescence from the different emissive materials can be controlled. The DC bias can be +0.5, +1.0, +1.5, +2.0, +2.5, +3.0, +3.5, +4.0, +4.5, +5.0, +5.5, +6.0, +6.5, +7.0, +7.5, +8.0, +8.5, +9.0, +9.5, +10.0, −0.5, −1.0, −1.5, −2.0, −2.5, −3.0, −3.5, −4.0, −4.5, −5.0, −5.5, −6.0, −6.5, −7.0, −7.5, −8.0, −8.5, −9.0, −9.5, or −10.0. This DC bias can be changed arbitrarily slow or fast (independent of the drive frequency of the device) to determine the length of time that the pixel emits a given color. Continuous multicolor or single color emission can be achieved without pattering of the different emissive materials.

EXAMPLES

Synthesis of ZnSe/ZnS:Mn/ZnS nanocrystals was carried out by a method adapted from Thakar et al.; *Nano Lett.* 2007, 7, 3429, which is incorporated by reference in its entirety. ZnSe cores were prepared by injecting 96 mg of diethyl zinc and 0.67 mL of trioctylphosphine (TOP)-selenide into a flask of 10 mL of oleylamine, degassed at 140° C. After heating at 270° C. for 90 minutes, the flask was cooled to 170° C. and a solution of 45 mg of manganese stearate, 76 mg of diethyl zinc, and 160 mg of hexamethyldisilathiane in 6 mL TOP was added at a rate of 1 drop per second. The resulting ZnSe/ZnS:Mn particles were precipitated twice using methanol and butanol and redispersed in hexane. This solution was then added to a degassed flask containing 10 g of trioctylphosphine oxide (TOPO) and 0.4 g of n-hexylphosphonic acid (HPA) at 80° C. The hexane was removed under vacuum. The flask was then placed under argon and heated to 170° C. A solution of 80 mg diethyl zinc and 160 mg of hexamethyldisilathiane in 5 mL TOP was added dropwise and the flask was cooled to room temperature. A 4 mL portion of hexane and a 4 mL portion butanol were then added. The ZnSe/ZnS:Mn/ZnS nanocrystals were finally precipitated twice using methanol and butanol and redispersed in chloroform.

Figure 7:
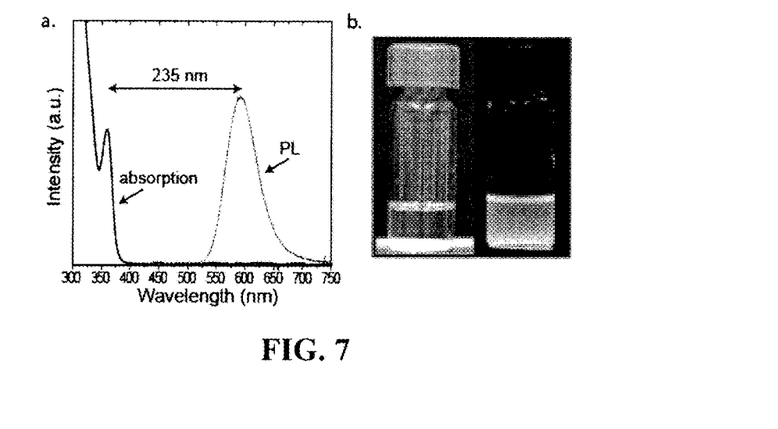
FIG. 7A is a graph depicting optical properties of ZnSe/ZnS:Mn/ZnS nanocrystals.
FIG. 7B is a photograph of a suspension of ZnSe/ZnS:Mn/ZnS nanocrystals illuminated by room light (left panel) and ultraviolet light (right panel).

FIG. 7A shows the absorption and photoluminescence (PL) spectra for these nanocrystals in solution. The nanocrystals did not absorb in the visible wavelength region because of the wide band gap of the host material, ZnSe. The PL spectrum was centered at wavelength $\lambda$=590 nm, characteristic of the Mn $^4T_1 \rightarrow {}^6A_1$ phosphor transition (Thakar R., et al.; *Nano Lett.* 2007, 7, 3429, which is incorporated by reference in its entirety). Streak camera measurements of this luminescence revealed an excited state lifetime in excess of 1 ms, consistent with the expected phosphorescent emission decay mechanism. The photographs of the nanocrystals in room light and under UV illumination (FIG. 7B) provide a visual indication of the transparency of the nanocrystals as well as their high quantum yield (QY), which was measured to be 65±5% for the nanocrystals in solution. A direct measurement of QY by comparing the solution to an organic dye was not possible, due to the large Stokes shift in the ZnSe/ZnS:Mn/ZnS nanocrystals. The QY measurement was therefore performed by comparing the nanocrystal solution to a solution of orange emitting CdSe/ZnS quantum dots with a QY of 65%, previously calibrated to a solution of Rhodamine 610 (QY=95%). In addition to having a high QY, the ZnSe/ZnS:Mn/ZnS nanocrystal solution also exhibited a long shelf life. The nanocrystal solution pictured in FIG. 7B was synthesized more than one year prior to the date of the photographs.

Figure 5:
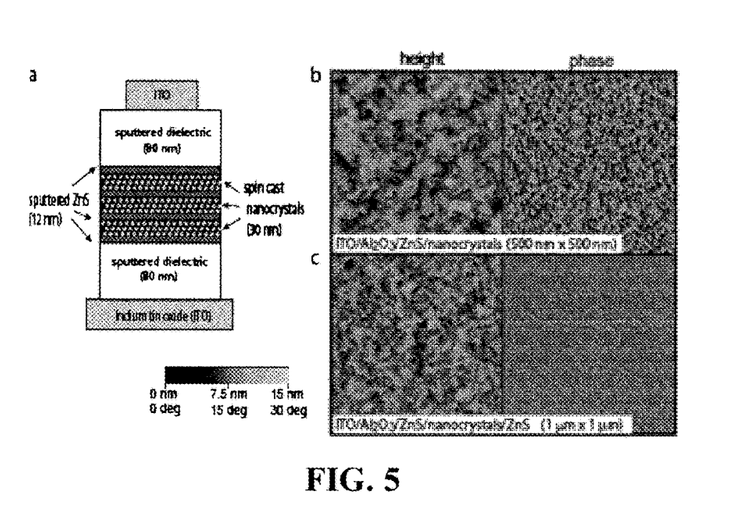
FIG. 5A is a schematic drawing depicting a light-emitting device.
FIGS. 5B-5C are AFM images of a light-emitting device in different stages of manufacturing.

The AC-TFEL device structure that enabled electrical excitation of the doped nanocrystals is shown schematically in FIG. 4D and FIG. 5A. It was fabricated using room temperature radio frequency (RF) magnetron sputtered ceramics and solution deposited nanocrystals. An 80 nm thick layer of an insulating metal oxide of either $Al_2O_3$ or $HfO_2$ was sputtered onto commercially-deposited indium tin oxide (ITO) on glass from Thin Film Devices, Inc. Both the bottom and top insulating layers were sputtered in an inert Ar environment at 4 mTorr with a power of either 150 Watts (for $Al_2O_3$) or 100 Watts (for $HfO_2$). The sputter-deposited insulating films were complete and planar, as revealed by atomic force microscopy (AFM) characterization. For a device including of $Al_2O_3$ layers, for example, a root-mean-square (rms) surface roughness of 0.3 nm was measured for the bottom layer, and an rms surface roughness of 0.9 nm for the top layer. The observation of rms roughness of less than 1 nm over a 5 μm×5 μm area of the top insulating layers indicated that the multiple ZnS and nanocrystal layers in the middle of the device structure maintained planarity throughout the multilayer growth.

Alternating layers of sputtered ZnS and spin cast ZnSe/ZnS:Mn/ZnS nanocrystals were deposited over the bottom dielectric layer. Each layer of ZnS was 12 nm thick and was sputter-deposited with a power of 25 Watts in 4 mTorr of Ar. A thickness of 12 nm of ZnS was chosen because it was sufficient to form a complete layer that was not damaged upon subsequent spin-casting of the next nanocrystal layer. Thicker ZnS layers, while also complete and capable of withstanding the subsequent spin-casting steps, increased the turn-on voltage of the device. The layers of nanocrystals were spin cast onto the ZnS from chloroform at a speed of 1200 rpm in a nitrogen glove box. Cross sectional AFM scans indicated that the total thickness of each layer of nanocrystals was approximately 30 nm, corresponding to approximately 4 to 5 layers of nanocrystals. FIGS. 3B and 3C show AFM topography and phase images of the nanocrystal layer and the first ZnS layer on top of the nanocrystals. The rms roughnesses of the two layers were 1 nm and 0.8 nm, respectively, which indicated that both the nanocrystals and the ZnS formed smooth, complete layers. The contrast between the phase images in FIGS. 5B and 5C (right hand panels) further confirms the completeness of the ZnS layer on top of the nanocrystals. The device was completed with a second, 80 nm-thick insulating layer and a 150 nm thick top electrode of either ITO or Al, which were sputtered at 35 W in 4 mTorr of Ar. Use of ITO for a top electrode resulted in a highly transparent device.

Alternating layers of ZnS and nanocrystals were found to be necessary for useful device electroluminescence (EL). To confirm that the ZnS layers were critical to device operation, four devices were fabricated with continuous 30 nm or 90 nm-thick layers of ZnSe/ZnS:Mn/ZnS nanocrystals sandwiched between both $Al_2O_3$ and $HfO_2$ dielectric layers. The 90 nm-thick layer was spin cast using a more concentrated solution of nanocrystals, and its thickness and uniformity were characterized by AFM, as described previously. No EL was observed from these devices, indicating that the device luminescence was determined by the number of ZnS layer-nanocrystal interfaces, rather than the number of luminescent dopant centers.

Devices having two, three, four, or five ZnS layers (each 12 nm thick) were fabricated. These devices included one, two, three, or four layers of nanocrystals, respectively, each nanocrystal layer being sandwiched between ZnS layers, and each nanocrystal layer being 30 nm thick. In these devices, 80 nm thick $Al_2O_3$ layers were used as the dielectrics, and Al as the top electrode. EL was measured while the devices were biased with a square-wave pulse at a frequency of 30 kHz and peak-to-peak voltage ($V_{pp}$) of 110 V. The measured EL response is shown in FIG. 7A. The luminescence from the device with two layers of ZnS was below the reliable detection threshold. Four layers of ZnS was found to be optimal in this construction. Devices with three and five layers of ZnS (containing two or four layers of nanocrystals, respectively) exhibited lower EL intensity than the device with four ZnS layers. The device with five layers of ZnS (four layers of nanocrystals) could operate at the same brightness as the four ZnS layer device, but required an increased operating voltage to do so, probably because of the additional voltage drop across the insulating layers of ZnS and nanocrystals. These results demonstrated the importance of maximizing both the number of interfaces and the electric field applied across the nanocrystal layers.

Figure 8:
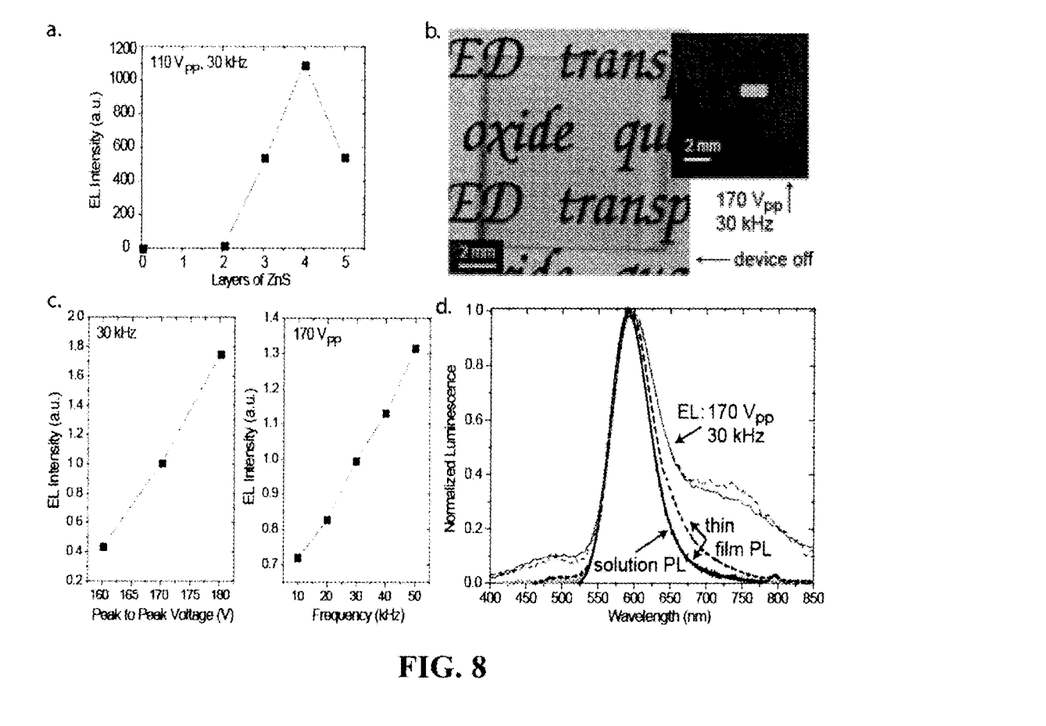
FIG. 8A is a graph depicting operational characteristics of a light-emitting device.
FIG. 8B are a photographs of a light-emitting device in the off (left) and on (right) states.
FIGS. 8C-8D are graphs depicting optical and operational characteristics of a light-emitting device.

The following results pertain to transparent devices with four layers of ZnS and three 30 nm-thick layers of nanocrystals, depicted schematically in FIG. 4D and FIG. 5A. The photographs in FIG. 5B provide a visual indication of device transparency, as well as the uniform illumination at 2 Cd/$m^2$ of a 1 mm×2 mm pixel with an applied voltage of 170 $V_{pp}$ at 30 kHz. The device was tested using an HP 3254A function generator, which allowed the frequency to be swept across a large range with voltages up to 200 $V_{pp}$. The devices showed EL emission at frequencies greater than 10 kHz and with voltages as low as 110 $V_{pp}$ (for operation at 30 kHz). Trends of increasing EL intensity as a function of both increasing voltage and increasing frequency were observed (FIG. 8C). These trends were consistent with impact excitation of the Mn dopant, whereby electrons were accelerated across the sputtered ZnS layers. However, the trends also suggested a possible mechanism in which the high electric field caused an electron to be removed from the valence band of the nanocrystal, leaving a hole behind. An electron from a neighboring nanocrystal, aided by the field, could then couple with the hole to form an exciton on the ZnSe core. The energy of this exciton could be transferred to the Mn dopant.

FIG. 8D shows normalized EL spectra for devices operating at 30 kHz and 170 $V_{pp}$ with either $Al_2O_3$ (solid orange line) or $HfO_2$ (dashed orange line) insulating layers. The overlap of these spectra confirmed that the insulating layer did not contribute to or affect the observed EL spectral shape. The dominant peaks in the two EL spectra overlapped with the solution PL spectrum (gray line), indicating that the phosphor $^4T_1 \rightarrow ^6A_1$ transition accounted for the EL response. The broad background emission that spanned wavelengths from 450 nm into the near-IR was likely a result of electrical excitation of ZnSe defect states that could be created during the sputtered ZnS layer deposition. These defect states could similarly be excited by exciton energy transfer from the ZnSe core. A PL spectrum (black line) of an incomplete device structure (ITO/$Al_2O_3$/ZnS/30 nm nanocrystals) matched the solution PL spectrum and shows no evidence of defect states (in FIG. 8D, the black and grey lines overlap almost completely and are therefore difficult to distinguish). However, the PL spectrum of a more complete structure (ITO/$Al_2O_3$/ZnS/30 nm nanocrystals/ZnS) (dashed black line) exhibited broadening of the red and blue edges of the nanocrystal luminescence, which was indicative of defect states. The defect states were more prominent in the EL spectra than in the PL spectrum, suggesting that the PL excitation probes all nanocrystals, while the EL signal was dominated by nanocrystals at the ZnS interface. While the shape of the EL spectrum was the same regardless of the insulating material used, the EL intensity was a factor of two lower for devices using $HfO_2$ instead of $Al_2O_3$. This observation was consistent with a field driven excitation mechanism for the doped nanocrystals. Since the static dielectric constant of $HfO_2$ is approximately twice that of $Al_2O_3$, the field drop should be larger across the $HfO_2$ layers than across the $Al_2O_3$ layers in otherwise comparable device structures. This would imply a reduction in the electric field across the nanocrystals and ZnS in the $HfO_2$-containing structures, consistent with the observed lower EL intensity of $HfO_2$-containing structures.

Other embodiments are within the scope of the following claims.

What is claimed is:

1. A light emitting device comprising:
    a first electrode;
    a first dielectric material adjacent to the first electrode;
    a second electrode;
    a second dielectric material adjacent to the second electrode; and
    an emissive layer between the first dielectric material and second dielectric material, wherein the emissive layer includes a wide band gap semiconductor material, an insulating material, or a combination thereof, and a plurality of semiconductor nanocrystals,
    wherein the emissive layer includes a multilayer structure comprising layers of luminescent organic molecules and semiconductor nanocrystals.

2. The light emitting device of claim 1, wherein the emissive layer includes a first nanocrystal layer having a top face and a bottom face.

3. The light emitting device of claim 2, wherein at least one of the top face and the bottom face is adjacent to the wide band gap semiconductor material or the insulating material.

4. The light emitting device of claim 2, wherein the top face is adjacent to a first layer of the wide band gap semiconductor material or insulating material, and the bottom face is adjacent to a second layer of the wide band gap semiconductor material or the insulating material.

5. The light emitting device of claim 1, wherein the emissive layer includes a polymer matrix, wherein at least a portion of the plurality of semiconductor nanocrystals are dispersed in the polymer matrix.

6. The light emitting device of claim 1, wherein the emissive layer includes more than one nanocrystal layer alternating with layers of the wide band gap semiconductor material or the insulating material.

7. The light emitting device of claim 6, wherein the device is substantially transparent to at least a portion of visible wavelengths of light.

8. The light emitting device of claim 1, wherein the emissive layer includes a luminescent organic small molecule.

9. The light emitting device of claim 1, wherein the emissive layer includes a mixture of emissive species molecules or a doped material.

10. The light emitting device of claim 1, wherein the emissive layer includes a conductive polymer.

11. The light emitting device of claim 1, wherein the emissive layer includes a mixture of luminescent organic small molecules and semiconductor nanocrystals or a mixture of conductive polymers and semiconductor nanocrystals.

12. The light emitting device of claim 1, wherein the plurality of semiconductor nanocrystals includes a doped semiconductor nanocrystal.

13. The light emitting device of claim 1, wherein the plurality of semiconductor nanocrystals includes a first population of semiconductor nanocrystals selected to emit a single color of light.

14. The light emitting device of claim 13, wherein the first population of semiconductor nanocrystals is selected to emit visible light or infrared light.

15. The light emitting device of claim 1, wherein the plurality of semiconductor nanocrystals includes more than one distinct populations of nanocrystals selected to emit more than one different color of light.

16. The light emitting device of claim 15, wherein the plurality of semiconductor nanocrystals are selected to produce a white light emission from the device.

* * * * *